US012732404B2

(12) United States Patent
Lee et al.

(10) Patent No.: US 12,732,404 B2
(45) **Date of Patent: *Sep. 8, 2026**

(54) MULTI-LAYER TRANSMISSION AND RECEPTION METHOD IN 1-BIT QUANTIZATION SYSTEM, AND APPARATUS THEREFOR

(71) Applicant: LG ELECTRONICS INC., Seoul (KR)

(72) Inventors: Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

This patent is subject to a terminal disclaimer.

(21) Appl. No.: 19/005,562

(22) Filed: Dec. 30, 2024

(65) Prior Publication Data

US 2025/0132960 A1 Apr. 24, 2025

Related U.S. Application Data

(63) Continuation of application No. 17/767,025, filed as application No. PCT/KR2019/013093 on Oct. 7, 2019, now Pat. No. 12,184,459.

(51) Int. Cl.

| | |
|---|---|
| ***H04L 27/227*** | (2006.01) |
| ***H04L 5/00*** | (2006.01) |
| ***H04L 27/20*** | (2006.01) |

(52) U.S. Cl.

CPC .......... *H04L 27/227* (2013.01); *H04L 5/0055* (2013.01); *H04L 27/20* (2013.01)

(58) Field of Classification Search

CPC ...... H04L 27/227; H04L 27/20; H04L 5/0055

USPC .......................................................... 375/262

See application file for complete search history.

(56) References Cited

U.S. PATENT DOCUMENTS

2015/0358104 A1* 12/2015 Ohwatari ............... H04J 11/005 370/252

2020/0021414 A1* 1/2020 Ding ..................... H04L 27/233

* cited by examiner

*Primary Examiner* — Leila Malek

(74) *Attorney, Agent, or Firm* — BRYAN CAVE LEIGHTON PAISNER LLP

(57) ABSTRACT

Disclosed are a multi-layer transmission and reception method in a communication system based on 1-bit quantization in a wireless communication system, and an apparatus for supporting same. Particularly, a method by which a first device transmits and receives a signal in a wireless communication system comprises the steps of: receiving a reference signal (RS) from a second device; generating a demodulation reference vector on the basis of the RS; and receiving a data signal from the second device by using the demodulation reference vector, wherein the RS can be generated differently according to the modulation of the data signal.

20 Claims, 9 Drawing Sheets

[FIG. 1]
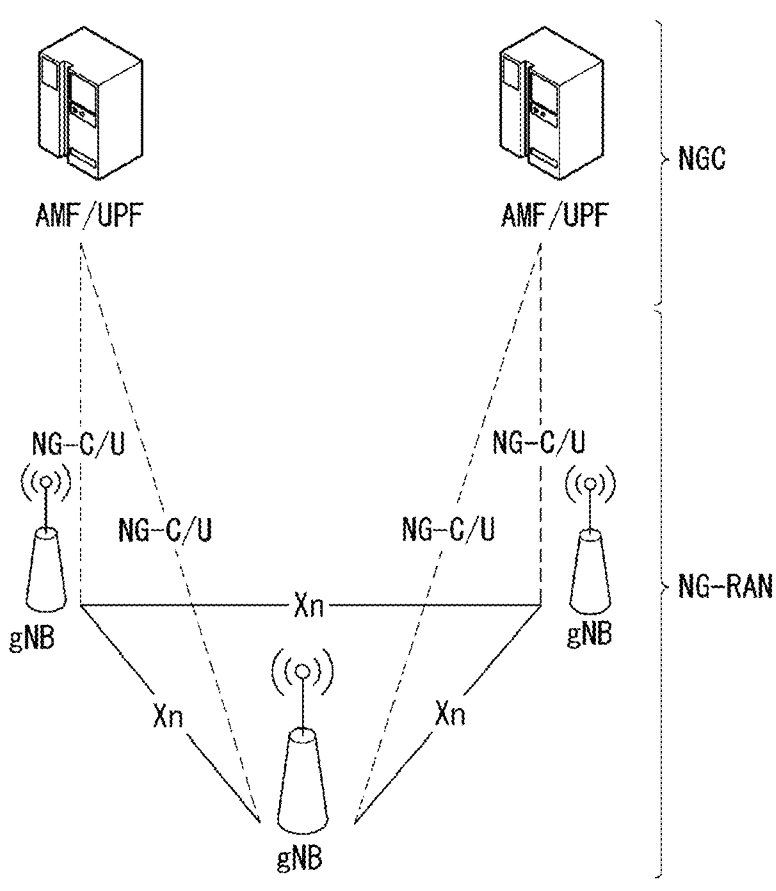
[FIG. 2]
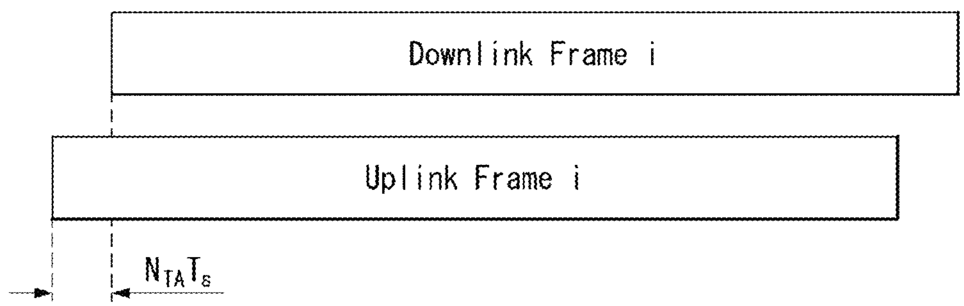

[FIG. 3]
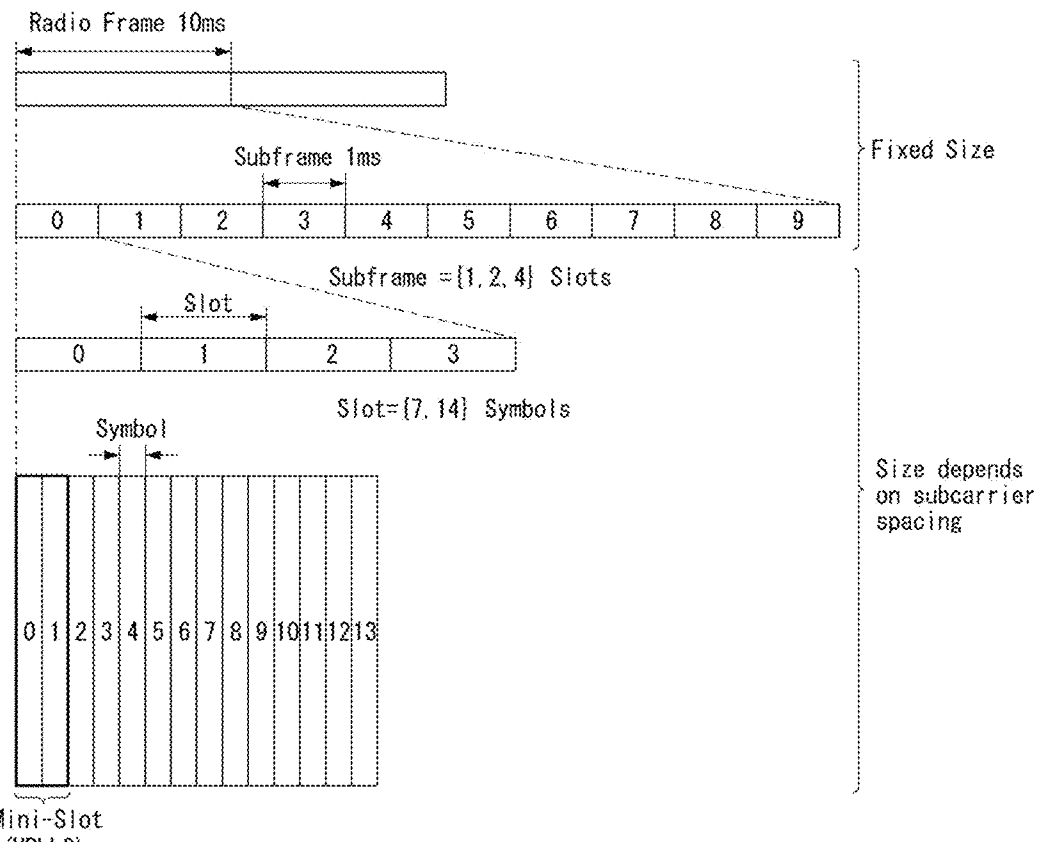

[FIG. 4]
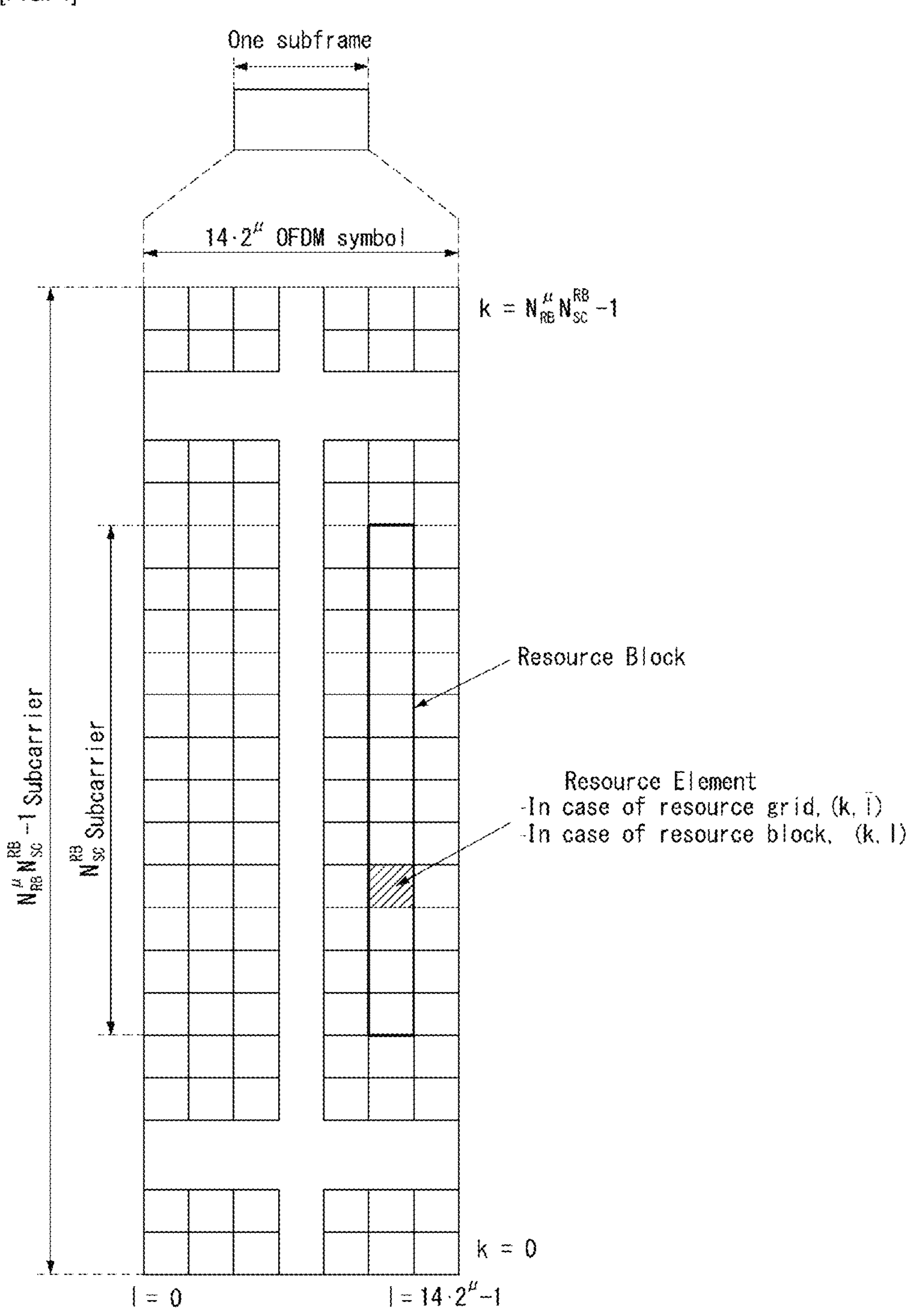

[FIG. 5]
Antenna Port A
Antenna Port B
Numerology X
Antenna Port A
Antenna Port B
Numerology Y
[FIG. 6]
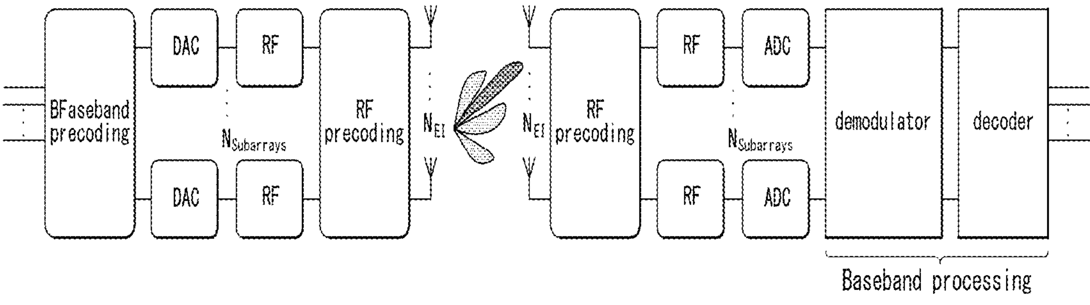

[FIG. 7]
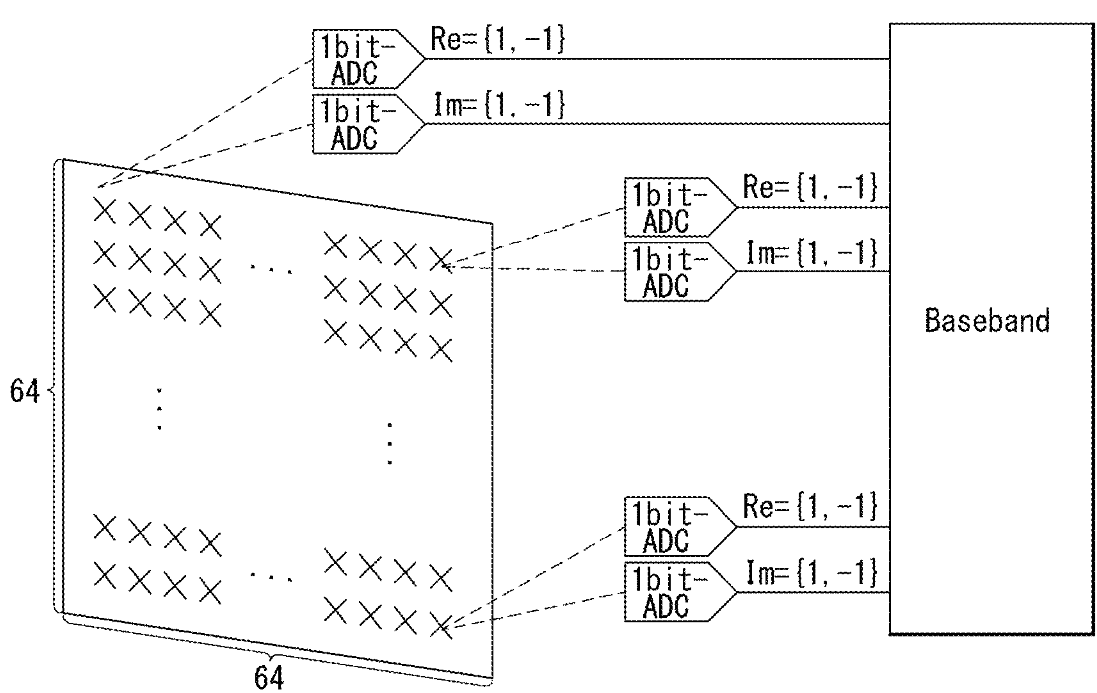

[FIG. 8]
TRANSMITTING DEVICE
RECEIVING DEVICE
S810
TRANSMIT REFERENCE SIGNAL
GENERATE DEMODULATION REFERENCE VECTOR
S820
S830
TRANSMIT DATA SIGNAL
DECODE
S840
[FIG. 9]
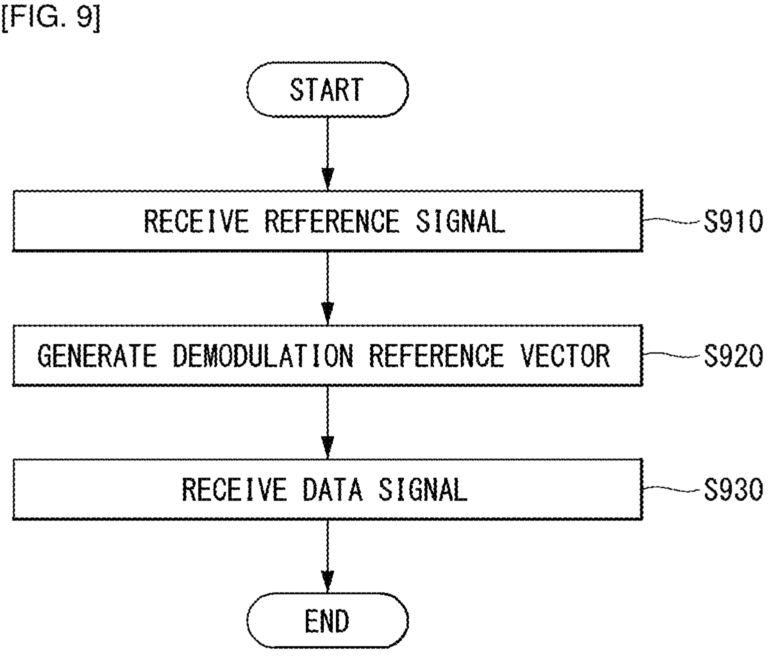

[FIG. 10]
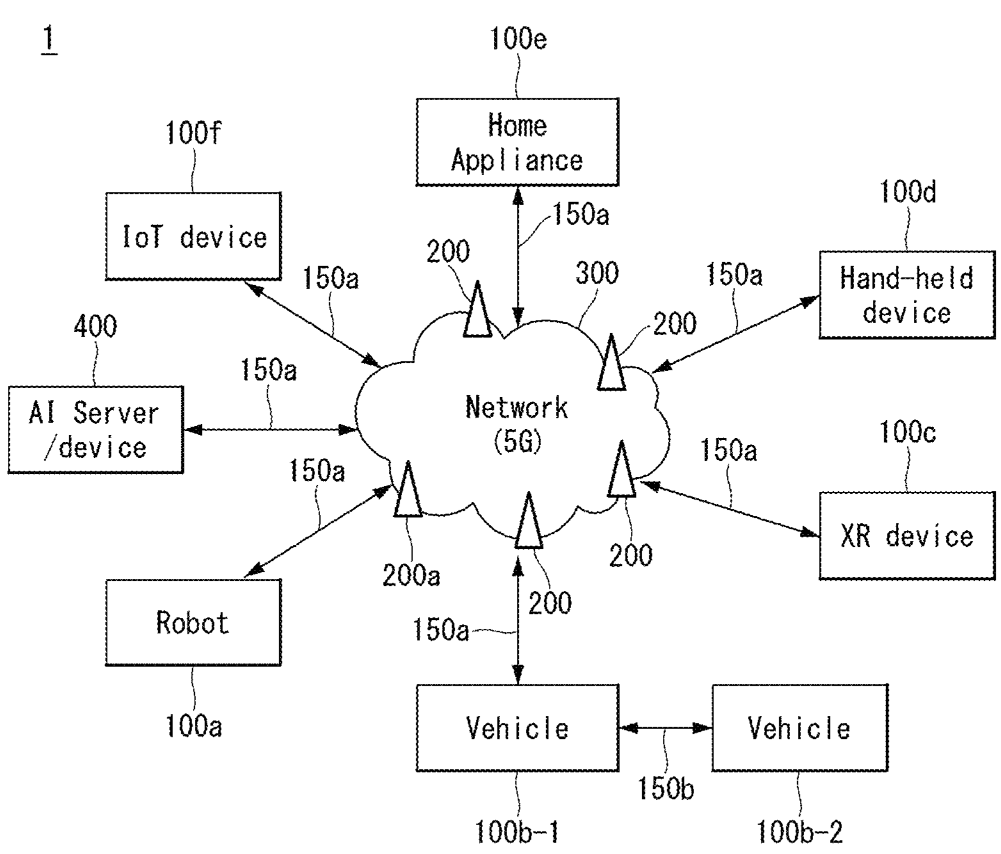
[FIG. 11]
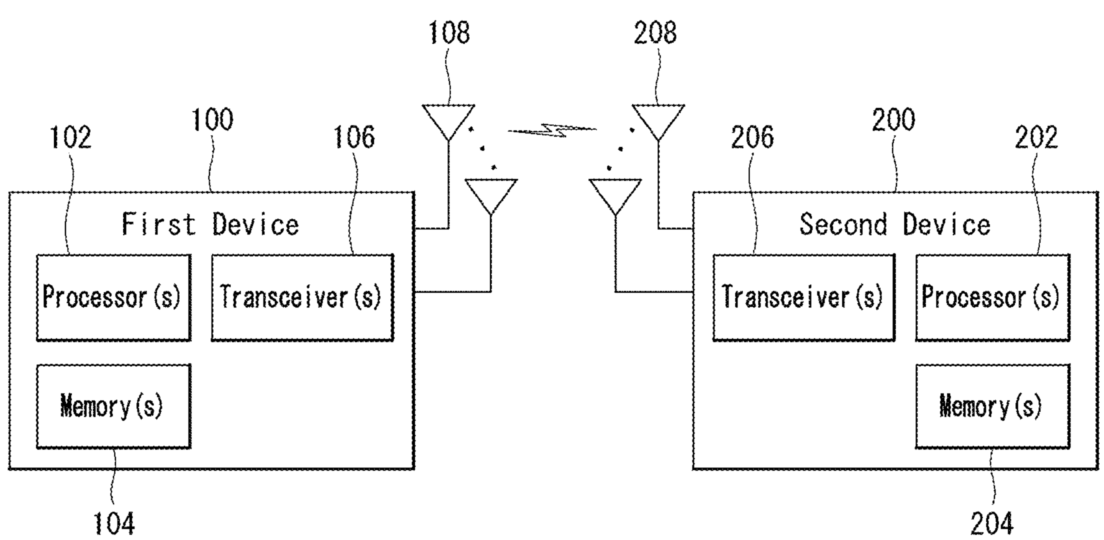

[FIG. 12]
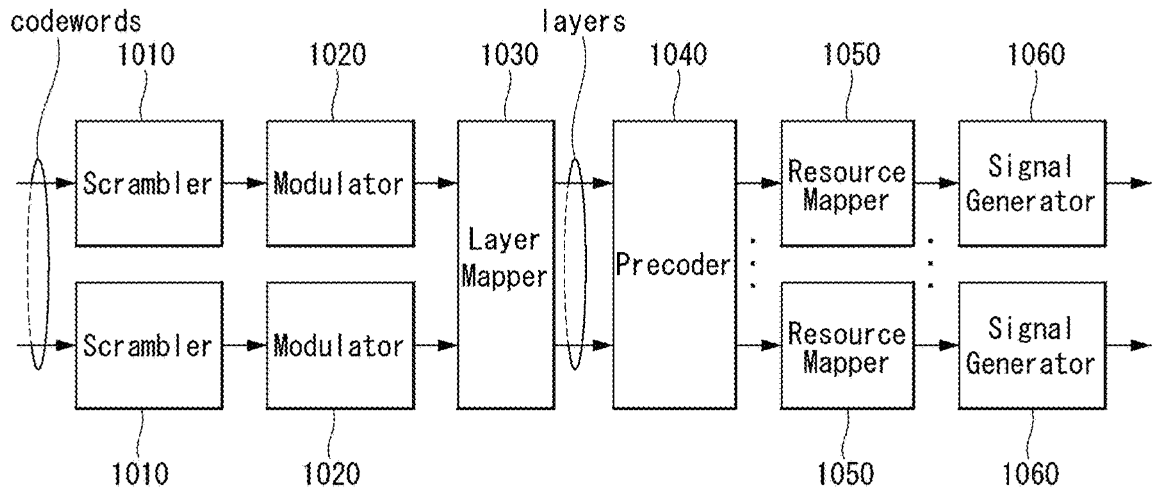
[FIG. 13]
Device(100, 200)
Communication unit(110)
(e.g., 5G communication unit)
Communication circuit(112)
(e.g., processor(s), memory(s))
Transceiver(s)(114)
(e.g., RF unit(s), antenna(s))
Control unit(120)
(e.g., processor(s))
Memory unit(130)
(e.g., RAM, storage)
Additional components(140)
(e.g., power unit/battery, I/O unit, driving unit, computing unit)

[FIG. 14]
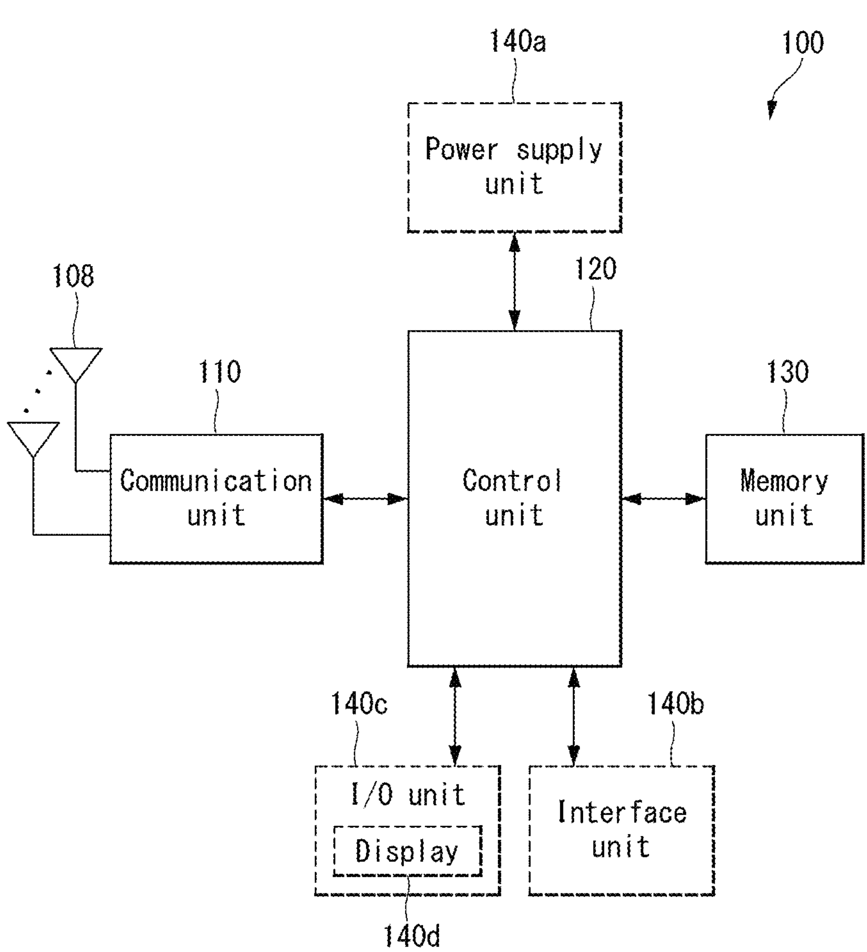

MULTI-LAYER TRANSMISSION AND RECEPTION METHOD IN 1-BIT QUANTIZATION SYSTEM, AND APPARATUS THEREFOR

CROSS-REFERENCE TO RELATED APPLICATIONS

This application is a Continuation of U.S. application Ser. No. 17/767,025 filed on Apr. 6, 2022, which is the National Stage filing under 35 U.S.C. 371 of International Application No. PCT/KR2019/013093 filed on Oct. 7, 2019, the contents of which are hereby incorporated by reference herein in their entirety.

TECHNICAL FIELD

The present disclosure relates to a wireless communication system, and more particularly, to a multi-layer transmission and reception method in a communication system based on 1-bit quantization and an apparatus supporting the same.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present specification provides a signal (data) transmission and reception method based on 1-bit quantization considering energy efficiency.

The present specification provides a multi-layer transmission and reception method based on 1-bit quantization.

The present specification provides a method of transmitting a reference signal for multi-layer transmission and reception based on 1-bit quantization.

The present specification provides a method of calculating an LLR for a 1-bit quantized data signal.

Technical problems to be solved by the present disclosure are not limited by the above-mentioned technical problems, and other technical problems which are not mentioned above can be clearly understood from the following description by those skilled in the art to which the present disclosure pertains.

Technical Solution

In the present disclosure, a method of transmitting and receiving a signal, by a first device, in a wireless communication system, the method comprising: receiving, from a second device, a reference signal (RS); generating a demodulation reference vector based on the reference signal; and receiving, from the second device, a data signal based on the demodulation reference vector, wherein the reference signal is generated differently based on a modulation method of the data signal.

Furthermore, in the present disclosure, wherein the first device and the second device support multi-layer based transmission and reception, and wherein the reference signal is generated based on a number of layers of the multi-layer.

Furthermore, in the present disclosure, wherein the reference signal is received in {(modulation order of the data signal)^(number of layers−1)} time slots.

Furthermore, in the present disclosure, wherein at least one of reference signals received in a specific time slot has a phase difference of {2pi (π)/modulation order of the data signal} with a reference signal received in a previous time slot.

Furthermore, in the present disclosure, wherein the modulation method of the data signal is BPSK (Binary Phase Shift Keying) or QPSK (Quadrature Phase Shift Keying).

Furthermore, in the present disclosure, wherein based on the modulation method of the data signal being the BPSK, the demodulation reference vector is generated by rotating the reference signal in pi (π) unit.

Furthermore, in the present disclosure, wherein based on the modulation method of the data signal being the QPSK, the demodulation reference vector is generated by rotating the reference signal in pi (π)/2 unit.

Furthermore, in the present disclosure, wherein the receiving the data signal comprises: calculating a log likelihood ratio (LLR) of the data signal based on the demodulation reference vector.

Furthermore, in the present disclosure, wherein Each receive path of the first device includes a 1-bit analog to digital converter (ADC), and wherein the reference signal and the data signal are quantized through the 1-bit ADC.

Furthermore, in the present disclosure, a method of transmitting and receiving a signal, by a first device, in a wireless communication system, the method comprising: transmitting, to a second device, a reference signal (RS); transmitting, to the second device, a data signal, wherein the reference signal is generated differently based on a modulation method of the data signal.

Furthermore, in the present disclosure, wherein the first device and the second device support multi-layer based transmission and reception, and wherein the reference signal is generated based on a number of layers of the multi-layer.

Furthermore, in the present disclosure, wherein the reference signal is received in {(modulation order of the data signal)^(number of layers−1)} time slots.

Furthermore, in the present disclosure, wherein at least one of reference signals received in a specific time slot has a phase difference of {2pi (π)/modulation order of the data signal} with a reference signal received in a previous time slot.

Furthermore, in the present disclosure, wherein a transmission order of the reference signal is independent of a demodulation of the data signal.

Furthermore, in the present disclosure, a device for transmitting and receiving a signal in a wireless communication system, the device comprising: transmission and reception unit for transmitting and receiving a radio signal, and a processor functionally connected to the transmission and reception unit, wherein the processor is configured to: receiving, from a second device, a reference signal (RS);

generating a demodulation reference vector based on the reference signal; and receiving, from the second device, a data signal based on the demodulation reference vector, wherein the reference signal is generated differently based on a modulation method of the data signal.

Advantageous Effects

According to an embodiment of the present specification, it is possible to implement multi-layer transmission and reception in a 1-bit quantization system.

In addition, according to an embodiment of the present specification, it is possible to improve power consumption of a system through a transmission/reception method based on 1-bit quantization.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included as part of the detailed description to assist understanding of the present disclosure, illustrate embodiments of the present disclosure and explain the technical features of the present disclosure together with the detailed description;

FIG. 1 is a diagram illustrating an example of an overall system structure of an NR to which a method proposed in the present disclosure may be applied.

FIG. 2 is a diagram illustrating a relationship between an uplink frame and a downlink frame in a wireless communication system to which the method proposed in the present disclosure may be applied.

FIG. 3 is a diagram illustrating an example of a frame structure in an NR system.

FIG. 4 is a diagram illustrating an example of a resource grid supported by a wireless communication system to which the method proposed in the present disclosure may be applied.

FIG. 5 is a diagram illustrating examples of an antenna port to which the method proposed in the present specification may be applied and a resource grid for each numerology.

FIG. 6 is a diagram illustrating an example of a block diagram of a transmitting end and a receiving end.

FIG. 7 is a diagram an example of a receiving device including a 64×64 two-dimensional antenna and a 1-bit analog to digital converter (ADC) connected to each antenna.

FIG. 8 is a diagram illustrating a signaling procedure between a receiving device and a transmitting device to which the method and embodiment proposed in the present specification may be applied.

FIG. 9 is a diagram illustrating an example of an operation flowchart of a receiving device to which the method and embodiment proposed in the present specification can be applied.

FIG. 10 is a diagram illustrating a communication system 1 applicable to the present specification.

FIG. 11 illustrates a wireless device applicable to the present specification.

FIG. 12 is a diagram illustrating a signal processing circuit for a transmitted signal.

FIG. 13 is a diagram illustrating another example of a wireless device applied to the present specification.

FIG. 14 is a diagram illustrating a portable device applied to the present specification.

MODE FOR DISCLOSURE

Hereinafter, preferred embodiments according to the present disclosure will be described in detail with reference to the accompanying drawings. The detailed description to be disclosed below with the accompanying drawings is intended to describe exemplary embodiments of the present disclosure, and is not intended to represent only embodiments in which the present disclosure may be practiced. The detailed description below includes specific details to provide a thorough understanding of the present disclosure. However, those skilled in the art appreciate that the present disclosure may be practiced without these specific details.

In some cases, in order to avoid obscuring the concept of the present specification, well-known structures and devices may be omitted, or may be shown in a block diagram form centering on core capabilities of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE

- 36.211: Physical channels and modulation
- 36.212: Multiplexing and channel coding
- 36.213: Physical layer procedures
- 36.300: Overall description
- 36.331: Radio Resource Control (RRC)

3GPP NR

- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHZ). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New RAT (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or $\mu$). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerology (or subcarrier spacing (SCS)) to support various 5G services. For example, when the SCS is 15 kHz, it supports a wide area in traditional cellular bands, and when the SCS is 30 KHz/60 kHz, it supports dense-urban, lower latency, and wider carrier bandwidth, and when the SCS is 60 KHz or higher, it supports a bandwidth greater than 24.25 GHz to overcome the phase noise.

The NR frequency band is defined as a frequency range of two types (FR1, FR2). The FR1 and FR2 may be configured as illustrated in Table 2 below. In addition, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f)/100) \cdot T_s=10$ ms. The radio frame is composed of ten subframes each having a section of $T_{sf}=(\Delta f_{max} N_f)/1000) \cdot T_s=1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $$N_s^{\mu} \in \{0, \ldots, N_{subframe}^{slots,\mu}-1\}$$

a subframe and are numbered in increasing order of $$N_{sf}^{\mu} \in \{0, \ldots, N_{frame}^{slots,\mu}-1\}$$

within a radio frame. One slot consists of consecutive OFDM symbols of $$N_{symb}^{\mu}, \text{ and } N_{symb}^{\mu}$$

is determined depending on a numerology used and slot configuration. The start of slots $$n_s^{\mu}$$

in a subframe is aligned in time with the start of OFDM symbols $$n_s^{\mu} N_{symb}^{\mu}$$

in the same subframe.

Not all UEs are able to transmit and receive at the same time, and this means that not all OFDM symbols in a downlink slot or an uplink slot are available to be used.

Table 3 represents the number $$N_{symb}^{slot}$$

of OFDM symbols per slot, the number $$N_{slot}^{frame,\mu}$$

of slots per radio frame, and the number $$N_{slot}^{subframe,\mu}$$

of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 KHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $$N_{RB}^{\mu}N_{sc}^{RB}$$

subcarriers on a frequency domain, each subframe consisting of 14·2μ OFDM symbols, but the present disclosure is not limited thereto.

In the NR system, a transmitted signal is described by one or more resource grids, consisting of $$N_{RB}^{\mu}N_{sc}^{RB}$$

subcarriers, and $$2^{\mu}N_{symb}^{\mu}$$

OFDM symbols, where $$N_{RB}^{\mu} \leq N_{RB}^{max,\mu} \cdot N_{RB}^{max,\mu}$$

denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair(k, l¯), where $$k = 0, \ldots, N_{RB}^{\mu}N_{sc}^{RB} - 1$$

is an index on a frequency domain, and $$\bar{l} = 0, \ldots, 2^{\mu}N_{symb}^{\mu} - 1$$

refers to a location of a symbol in a subframe. The index pair (k, l¯), is used to refer to a resource element in a slot, where $$l = 0, \ldots, N_{symb}^{\mu} - 1.$$

The resource element (k, l¯) for the numerology μ and the antenna port p corresponds to a complex value $$a_{k,\bar{l}}^{(p,\mu)}.$$

When there is no risk for confusion or when a specific antenna port or numerology is not specified, the indexes p and μ may be dropped, and as a result, the complex value may be $$a_{k,\bar{l}}^{(p)}$$

r $a_{k,\bar{l}}$.

Further, a physical resource block is defined as $$N_{sc}^{RB} = 12$$

consecutive subcarriers in the frequency domain.

Point A serves as a common reference point of a resource block grid and may be obtained as follows.

- offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;
- absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with ‘point A’. A common resource block number $$n_{CRB}^{\mu}$$

in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equaiton 1]}$$

Here, k may be defined relative to the point A so that k=0 corresponds to a subcarrier centered around the point A. Physical resource blocks are defined within a size bandwidth part (BWP) and are numbered from 0 to $$N_{BWP,i}^{size} - 1,$$

where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $$N_{BWP,i}^{start}$$

start may be the common resource block where the BWP starts relative to the common resource block 0.

Enhanced Mobile Broadband Communication (eMBB)

In the case of an NR system, a massive MIMO environment in which Tx and Rx antennas are greatly increased may be considered. That is, as the massive MIMO environment is considered, the number of Tx and Rx antennas may be increased to several tens or several hundreds of antennas or more. In the massive MIMO environment, for the purpose of a reduction in the complexity of a hardware implementation, a performance increase using multiple antennas, the flexibility of resource allocation, and the easiness of beam control for each frequency, there is a need for a beamforming scheme having a hybrid form in which an analog beamforming scheme and a digital beamforming scheme are combined based on a location where a beamforming weight vector/precoding vector are applied.

FIG. 6 is a diagram illustrating an example of a block diagram of a transmitting end and a receiving end.

As illustrated in FIG. 6, when a transmission path is used, each element of a sub-array may have a phase shift applied directly to the RF domain, but a digital beamforming technique based on a complex weight vector may be applied to a signal supplied to each sub-array. The receiving end may receive a signal through a plurality of antennas and output a final signal through an analog to digital converter (ADC), a demodulator, a decoder, and the like. The final signal may be output as a differential signal in consideration of noise and signal amplification.

As described above, wireless communication technology is developing in a direction of increasing a data rate by utilizing a wide bandwidth (BW), multiple input multiple output (MIMO) technology, and the like. In addition, it is expected that a higher frequency will be used to secure a wider bandwidth in next-generation wireless communication. For example, after 5G (Beyond 5G) or 6G, communication technologies in a high frequency band ranging from 0.1 THz to 10 THz are being studied. In addition, as the carrier frequency increases, a value of free space path loss (FSPL) inevitably increases physically. To overcome this, the transmitting device/receiving device needs to be equipped with a large number of antennas to use beamforming technology.

In addition, it should be able to support a high data rate even at the front-end of a transmitting device/receiving device that supports a wide bandwidth and supports a large number of antennas. In particular, at the receiving end, the analog-to-digital converter (ADC) also requires high resolution and high sampling rate. However, the ADC supporting the high resolution and high sampling rate may consume a lot of power. For example, the high-performance ADC currently consumes several watts of power. In addition, in order to utilize the multiple antennas, an RF chain exists for each antenna and the ADC will be required very much, so power of tens to hundreds of watts will be required.

In particular, the power requirement represents a much larger amount of power compared to the battery capacity used by the receiving device (e.g., terminal), and if the power consumption of other hardware including the ADC is considered, power requirements can act as a bottleneck in the development of communications technology.

For the above-described problem, two solutions can be considered in consideration of energy efficiency. First, a hybrid method that configures an RF chain that includes a number of high-performance ADCs that are much smaller than the number of actual physical antennas and combines analog beamforming and digital beamforming by connecting multiple antennas to one RF chain may be considered. The above method may reduce power consumption by using the ADC that is smaller than the number of physical antennas, but the analog beamforming has a low degree of freedom in design, and a procedure for matching the received analog beamforming is complicated, which may cause system overhead. Second, a method of connecting a low-power RF chain to all physical antennas may be considered. In particular, the ADC may be configured as a 1-bit comparator to exponentially reduce power consumption. In addition, it can operate without automatic gain control (AGC).

The present disclosure proposes a method of transmitting and receiving data based on a second low-power RF chain, that is, a method using a 1-bit ADC. Also, hereinafter, since data is transmitted/received using the 1-bit ADC, it is referred to as a 1-bit ADC system, and may be replaced with the term 1-bit quantization system. In the 1-bit quantization system using the 1-bit ADC, loss occurs in terms of information of the received signal due to the 1-bit quantization, and from the viewpoint of the transmitted/received signal, the linear system modeling is no longer matched, so a new transmission/reception technique is required. Therefore, the present disclosure proposes a transmission/reception technique in a system (non-linear system) that minimizes information loss and does not establish a linear relationship between the transmitted signal and received signal.

FIG. 7 is a diagram illustrating an example of a block diagram of a transmitting stage and a receiving stage. In this case, a Radio Frequency (RF) front-end ahead of an ADC has been omitted. FIG. 7 is merely for convenience of description, and does not limit the scope of the present disclosure.

Referring to FIG. 7, for example, the receiving device may include 4096 (e.g., 64×64) antennas, and may include a 1-bit ADC for an I (in-phase) signal (e.g., a real number signal) and a Q (quadrature) signal (e.g., an imaginary number signal) of an RX path connected to each antenna.

In the existing receiving device including a high-performance ADC, a received signal having an a+bj (e.g., a and b are numbers each represented as 8 bits to 10 bits) form as the output of the high-performance ADC is delivered through a baseband. Hereinafter, the output of the existing high-performance ADC signal is denoted as an unquantized version. The high-performance ADC may be excellent in the resolution aspect of an output signal, but may be disadvantageous in the power consumption aspect of a system.

In contrast, referring to FIG. 6, the type of signal delivered in the baseband through a 1-bit ADC may be limited to four per Rx path. That is, a signal of one of 1+j, 1j, −1+j, and −1+j for each Rx path may be received. It may be difficult for a receiving device including a 1-bit ADC to obtain information, such as a Signal to Noise Ratio (SNR), due to an information loss, such as the size of a received signal, but to easily deliver information through phase information and to have power consumption of a system much smaller than that of a high-performance ADC.

As described above, as the signal transmitted by the transmitting device (e.g., base station) passes through the 1-bit ADC on the receiving device (e.g., terminal), information loss inevitably occurs. Also, the conventional modeling based on a linear system between a transmitted signal and a received signal may not be applied. Therefore, a new transmission/reception technique is required in consideration of 1-bit quantization.

In particular, it may be difficult to transmit a multi-layer (or stream) using the existing multiple input multiple output (MIMO) due to the information loss of the 1-bit ADC. In the conventional method of transmitting multiple layers in the MIMO environment, the transmitting device may transmit one or more channel estimation reference signals per antenna port, and the receiving device may estimate the MIMO channel through the received reference signals. In the present specification, transmitting/receiving a (multi) layer may mean transmitting/receiving data and/or a stream through the (multi) layer.

Based on the channel estimation, the receiving device may detect the data through equalization or non-linear receiving method. The above-described method may be based on the fact that the relationship between the transmitted signal and the received signal passing through the channel is a linear relationship. However, in the 1-bit quantization system, since the signal received through multiple layers is quantized through the 1-bit ADC, a linear relationship between the transmitted signal and the received signal may no longer be established. Equation 3 is an example of a signal before and after 1-bit quantization.

$$y = Hx + n$$
$$r = \mathrm{sgn}(y) = \mathrm{sgn}(Hx + n)$$
Equation 3

In Equation 3, y denotes a signal received before the 1-bit quantization. Here, H represents a channel matrix, x represents a transmitted signal from a transmitting device (e.g., a base station), and n represents additive white Gaussian noise (AWGN). In addition, r represents a received (output) signal after the 1-bit quantization, that is, through the 1-bit ADC. sgn( ) represents a sign function in a complex domain. That is, a value of a sign function of a complex number may be expressed by a projection of 0 in the case of 0 and a projection of the unit circle in the complex plane when it is not 0. As shown in Equation 3, the linear relationship between the input signal and the output signal is not established due to the 1-bit quantization.

As a specific example, a case of transmitting and receiving two-layers will be described.

Equation 4 shows examples of reference signals used for 2-layer transmission and reception in an environment in which the linear relationship is established. In the channel estimation step, the transmitting device (e.g., a base station) may transmit the reference signal for channel estimation to the receiving device (e.g., a terminal). The number of times of transmissions of the reference signal may be related to the number of layers (or streams). For example, for two-layer transmission/reception, the transmitting device may transmit two reference signals, and the receiving device may estimate the channel based on the reference signals.

$$\underline{y1} = H\underline{x} + \underline{n} = H\begin{bmatrix}1\\0\end{bmatrix} + \underline{n}$$
$$\underline{y2} = H\underline{x} + \underline{n} = H\begin{bmatrix}0\\1\end{bmatrix} + \underline{n}$$
$$\text{where } H \in \mathbb{C}^{N_r \times 2}$$
[Equation 4]

In Equation 4, [1, 0] and [0, 1] may correspond to the known reference signals. The channel estimation value $\overline{H}$ may be calculated from the received signals y1 and y2.

Equation 5 represents a signal received through the two-layer in the environment in which the linear relationship is established. In the data transmission/reception step, since the linear relationship as in Equation 5 is established, the receiving device may receive the data signal, calculate the LLR value based on the channel estimation value, and detect the data signal.

$$\underline{y} = H\underline{x} + \underline{n} = \begin{bmatrix}\underline{h_1} & \underline{h_2}\end{bmatrix}\begin{bmatrix}s_1\\s_2\end{bmatrix} + \underline{n} = \underline{h_1}s_1 + \underline{h_2}s_2 + \underline{n}$$
[Equation 5]

That is, in Equation 5, the received signal may be expressed as a linear sum of the product of the modulated signal transmitted from the two antenna ports and the channel.

However, in the 1-bit quantization system, since the linear relationship between the transmitted signal and the received signal is not established, the above-described method may not be applied. Equation 6 represents the reference signal received through the 1-bit quantization.

$$\underline{r1} = Q(H\underline{x}) = Q\left(H\begin{bmatrix}1\\0\end{bmatrix}\right)$$
$$\underline{r2} = Q\left(H\begin{bmatrix}0\\1\end{bmatrix}\right)$$
$$\text{where } H \in \mathbb{C}^{N_r \times 2}$$
$$Q(\;) \equiv \mathrm{sgn}(\;)$$
[Equation 6]

Here, r1 and r2 represent the received signal, Q( ) represents the quantization function, and can be approximated by sgn( ). [1, 0] and [0, 1] may correspond to the known reference signals. In addition, for convenience of description, an infinite SNR, that is, a no noise situation, is assumed in the reference signal transmission/reception step. It is possible to calculate the channel estimation value from the received signals r1 and r2.

Equation 7 represents the signal received through the two-layer in the environment in which the linear relationship is not established.

$$\underline{r} = Q\left(\begin{bmatrix}\underline{h_1} & \underline{h_2}\end{bmatrix}\begin{bmatrix}s_1\\ s_2\end{bmatrix}\right) = Q(\underline{h_1}s_1 + \underline{h_2}s_2) \neq Q(\underline{h_1}s_1) + Q(\underline{h_2}s_2) \quad \text{[Equation 7]}$$

Since the linear relationship as in Equation 5 is not established in Equation 7, it may not be expressed as a linear sum of the product of the transmitted signal s and the log likelihood ratio (LLR) may be calculated using the channel estimation value. As a result, since the linear relationship between the input signal and the output signal is not established when transmitting and receiving the multiple layers in the 1-bit quantization system, a new method for transmitting and receiving multiple layers is required. Accordingly, the present disclosure proposes a new reference signal and data transmission/reception method for transmitting/receiving a multi-layer in the 1-bit quantization system.

As described above, in the 1-bit quantization system, data may not be transmitted/received based on the conventional reference signal, so a method for generating and transmitting a new reference signal is required. Specifically, a method of transmitting a reference signal usable in a 1-bit quantization system may be considered in consideration of a modulation order of a data signal, the number of layers, and the like. In other words, a method of generating a reference signal may vary based on a signal modulation technique (e.g., BPSK, QPSK, etc.), the number of layers, and the like.

Hereinafter, specific examples of a method of generating a reference signal based on a signal modulation technique (e.g., BPSK, QPSK, etc.), the number of layers, and the like will be described. Examples to be described later are merely examples for the description of the disclosure, and do not limit the technical scope of the present disclosure. Therefore, it should not be construed as being limited to a specific modulation technique and a specific number of layers, and should be generally understood based on the following description.

Example 1: Case of BPSK Modulation, 2-Layer Transmission/Reception

A method of transmitting 2-layer using a binary phase shift keying (BPSK) modulation technique will be described. In addition, for convenience of description, it is assumed that an infinite signal to noise ratio (SNR), i.e., no noise, is present in the reference signal transmission/reception step.

Equation 8 represents reception of a reference signal for supporting the BPSK modulation and 2-layer transmission/reception in the 1-bit quantization system. It is assumed that the reference signal for supporting the modulation and 2-layer transmission/reception is a reference signal known to the receiving device and the transmitting device. As shown in Equation 8, the data detection may be enabled by transmitting the reference signal twice per antenna port (during two symbol times).

$$\underline{r1} = Q(H\underline{x}) = Q\left(H\begin{bmatrix}1\\ 1\end{bmatrix}\right) = Q(\underline{h_1} + \underline{h_2}) \quad \text{[Equation 8]}$$

$$\underline{r2} = Q\left(H\begin{bmatrix}1\\ -1\end{bmatrix}\right) = Q(\underline{h_1} - \underline{h_2})$$

$$\text{where } H \in \mathbb{C}^{N_r \times 2}$$

Referring to Equation 8, two reference signals may be transmitted for each antenna port. In other words, the transmitting device may transmit the reference signal in two time slots (indexes). Specifically, when transmitting the first reference signal, antenna port #1 may transmit 1, and antenna port #2 may transmit 1. When the second reference signal is transmitted, antenna port #1 may transmit 1, and antenna port #2 may transmit −1. That is, the reference signal transmitted from the antenna port #2 may be rotated and transmitted by pi (p) compared to the reference signal transmitted at the previous time index (time slot). In other words, when the first reference signal is transmitted, there is no phase difference between the reference signals transmitted from each antenna port, but when the second reference signal is transmitted, the phase difference between reference signals transmitted from each antenna port may be different by pi (p) for transmission.

The antenna port #1 and the antenna port #2 are only exemplary expressions for distinguishing a plurality of antenna ports, and do not limit the scope of the present disclosure. Therefore, each may be understood as an independent antenna port, and should not be construed as being limited to the number of a specific antenna port.

Equation 9 represents four demodulation reference vectors. The receiving device may configure four demodulation reference vectors vi for demodulation by utilizing the received reference signals r1 and r2. Hereinafter, vectors generated for demodulation based on a reference signal are referred to as a demodulation reference vector. Hereinafter, vectors generated for demodulation based on a reference signal are referred to as a demodulation reference vector.

$$\underline{v1} = Q(\underline{h_1} + \underline{h_2}) = \underline{r1} \quad \text{[Equation 9]}$$

$$\underline{v2} = Q(\underline{h_1} - \underline{h_2}) = \underline{r2}$$

$$\underline{v3} = Q(-\underline{h_1} - \underline{h_2}) = -1 \times Q(\underline{h_1} + \underline{h_2}) = -\underline{r1}$$

$$\underline{v4} = Q(-\underline{h_1} + \underline{h_2}) = -1 \times Q(\underline{h_1} - \underline{h_2}) = -\underline{r2}$$

The quantization function Q( ) has the same characteristics as in Equation 10.

$$Q(a + bj) = -1 \times Q(-a - bj) \quad \text{[Equation 10]}$$

Based on the characteristic of Equation 10, in Equation 9, v3 may be derived by reversing a sign of each element from r1(v1). The above-described characteristic of the quantization function Q( ) may be applied to v4 in Equation 9, and v4 may also be calculated from r2(v2). As a result, four demodulation reference vectors may be configured by transmitting [1, 1], [1, −1] as new reference signals for supporting the BPSK modulation and 2-layer transmission/reception in the 1-bit quantization system. It may be seen that the configured demodulation reference vectors (e.g., v1, v2, v3, v4) include all cases of a BPSK-modulated signal. That is, when the modulated transmission signal of the antenna port #1 is represented by s1 and the modulated transmission signal of the antenna port #2 is represented by s2, [s1, s2]={[1, 1], [1, −1], [−1, 1], [−1, −1]}.

In the data transmission/reception step, the receiving device may perform the log-likelihood ratio (LLR) and data detection for the received signal vector r based on the demodulation reference vector.

Equation 11 represents an equation for calculating the LLR by receiving the BPSK-modulated data signal through the 2-layer. The LLR may be calculated based on the demodulation reference vector of Equation (9).

$$\underline{r} = Q\left(\begin{bmatrix}\underline{h_1} & \underline{h_2}\end{bmatrix}\begin{bmatrix}s_1\\ s_2\end{bmatrix} + \underline{n}\right) = Q\left(\underline{h_1}s_1 + \underline{h_2}s_2 + \underline{n}\right) \quad \text{[Equation 11]}$$

$$LLR = \frac{\sum_{\underline{x}\in X^{(1)}} p(\underline{r} \mid \underline{x}, \underline{v1}, \underline{v2}, \underline{v3}, \underline{v4})}{\sum_{\underline{x}\in X^{(0)}} p(\underline{r} \mid \underline{x}, \underline{v1}, \underline{v2}, \underline{v3}, \underline{v4})}$$

Through the above-described method, the transmitting device (e.g., base station) and receiving device (e.g., terminal) may transmit and receive the 2-layer transmission and reception of the signal modulated by the BPSK based on the two reference signals [1, 1] and [1, −1].

Example 2: Case of QPSK Modulation, 2-Layer Transmission/Reception

A method of transmitting 2-layer using a quadrature phase shift keying (QPSK) modulation technique will be described. In addition, for convenience of description, an infinite SNR, that is, a no noise situation, is assumed in the reference signal transmission/reception step.

Equation 12 represents reception of a reference signal for supporting the QPSK modulation and 2-layer transmission/reception in the 1-bit quantization system. As shown in Equation 12, the data detection may be enabled by transmitting the reference signal fourth times per antenna port (during four symbol times).

$$\underline{r1} = Q\left(H\begin{bmatrix}e^{j\pi/4}\\ e^{j\pi/4}\end{bmatrix}\right) = Q\left(e^{j\pi/4}\left(\underline{h_1} + \underline{h_2}\right)\right) \quad \text{[Equation 12]}$$

$$\underline{r2} = Q\left(H\begin{bmatrix}e^{j\pi/4}\\ e^{j3\pi/4}\end{bmatrix}\right) = Q\left(e^{j\pi/4}\left(\underline{h_1} + j\underline{h_2}\right)\right)$$

$$\underline{r3} = Q\left(H\begin{bmatrix}e^{j\pi/4}\\ e^{j5\pi/4}\end{bmatrix}\right) = Q\left(e^{j\pi/4}\left(\underline{h_1} - \underline{h_2}\right)\right)$$

$$\underline{r4} = Q\left(H\begin{bmatrix}e^{j\pi/4}\\ e^{j7\pi/4}\end{bmatrix}\right) = Q\left(e^{j\pi/4}\left(\underline{h_1} - j\underline{h_2}\right)\right)$$

Referring to Equation 12, four reference signals may be transmitted for each antenna port (e.g., antenna ports #1 and #2). In other words, the transmitting device may transmit the reference signal in two time slots (indexes). Specifically, when transmitting the first reference signal, antenna port #1 may transmit $e^{j\pi/4}$, and antenna port #2 may transmit $e^{j\pi/4}$. When the third reference signal is transmitted, the antenna port #1 may transmit $e^{j\pi/4}$, and the antenna port #2 may transmit $e^{j3\pi/4}$. When the third reference signal is transmitted, the antenna port #1 may transmit $e^{j\pi/4}$, and the antenna port #2 may transmit $e^{j5\pi/4}$. When the fourth reference signal is transmitted, the antenna port #1 may transmit $e^{j\pi/4}$, and the antenna port #2 may transmit $e^{j7\pi/4}$. That is, the reference signal transmitted from the antenna port #2 may be rotated and transmitted by pi (p/2) compared to the reference signal transmitted at the previous time index (time slot). In other words, when the first reference signal is transmitted, there is no phase difference between the reference signals transmitted from each antenna port, but when the next reference signal is transmitted, the phase difference between reference signals transmitted from each antenna port may be different by pi (π/2, 3π/2) for transmission.

The antenna port #1 and the antenna port #2 are only exemplary expressions for distinguishing a plurality of antenna ports, and do not limit the scope of the present disclosure. Therefore, each of the antenna may be understood as an independent antenna port, and should not be construed as being limited to the number of a specific antenna port.

The receiving device (e.g., a terminal) may configure 16 demodulation reference vectors vi as shown in Table 5 for demodulation by utilizing the received four signals r1 to r4.

TABLE 5

| [s1 s2] | v | [s1 s2] | v | [s1 s2] | v | [s1 s2] | v |
|---|---|---|---|---|---|---|---|
| [1 + j, 1 + j] | v1 = r1 | [−1 + j, −1 + j] | v2 = $e^{j\pi/2}$ × r1 | [−1 − j, −1 − j] | v3 = $e^{j\pi}$ × r1 | [1 − j, 1 − j] | v4 = $e^{j3\pi/2}$ × r1 |
| [1 + j, −1 + j] | v5 = r2 | [−1 + j, −1 − j] | v6 = $e^{j\pi/2}$ × r2 | [−1 − j, 1 − j] | v7 = $e^{j\pi}$ × r2 | [1 − j, 1 + j] | v8 = $e^{j3\pi/2}$ × r2 |
| [1 + j, −1 − j] | v9 = r3 | [−1 + j, 1 − j] | v10 = $e^{j\pi/2}$ × r3 | [−1 − j, 1 + j] | v11 = $e^{j\pi}$ × r3 | [1 − j, −1 + j] | v12 = $e^{j3\pi/2}$ × r3 |
| [1 + j, 1 − j] | v13 = r4 | [−1 + j, 1 + j] | v14 = $e^{j\pi/2}$ × r4 | [−1 − j, −1 + j] | v15 = $e^{j\pi}$ × r4 | [1 − j, −1 − j] | v16 = $e^{j3\pi/2}$ × r4 |

As shown in Table 5 above, four demodulation reference vectors may be obtained by rotating each r1 by $e^{j\pi/2}$. Similarly, the remaining 12 demodulation reference vectors may be configured based on r2 to r4.

In the data transmission/reception step, the receiving device may perform the log-likelihood ratio (LLR) and data detection for the received signal vector r based on the demodulation reference vector.

Equation 13 shows the QPSK-modulated data signal and LLR calculation received through the two-layer.

$$\underline{r} = Q\left(\begin{bmatrix}\underline{h_1} & \underline{h_2}\end{bmatrix}\begin{bmatrix}s_1\\ s_2\end{bmatrix} + \underline{n}\right) = Q\left(\underline{h_1}s_1 + \underline{h_2}s_2 + \underline{n}\right) \quad \text{[Equation 13]}$$

$$LLR = \frac{\sum_{\underline{x}\in X^{(1)}} p\left(\underline{r} \mid \underline{x}, \{\underline{v_k}\}_{k=1,\ldots,16}\right)}{\sum_{\underline{x}\in X^{(0)}} p\left(\underline{r} \mid \underline{x}, \{\underline{v_k}\}_{k=1,\ldots,16}\right)}$$

Through the above-described method, the transmitting device (e.g., base station) and receiving device (e.g., terminal) may transmit and receive the 2-layer transmission and reception of the signal modulated with the QPSK based on the four reference signals.

Example 3: Case of QPSK Modulation, K-Layer Transmission/Reception

A K-layer transmission/reception method of a signal modulated with the QPSK will be described by extending Examples 1 and 2 above. Here, K corresponds to the number of layers and corresponds to a natural number.

Considering the case of 3-layer transmission/reception of a signal modulated with QPSK, the receiving device (e.g., a terminal) may construct a demodulation reference vector based on the reference signal shown in Table 6 and detect data.

In addition, even when the reference signals described in the above-described embodiments and methods (Example 1, Example 2, Example 3, etc.) proposed in the present disclosure rotate and transmit a constant phase corresponding to a multiple of $e^{j\pi/2}$, the reference signals may be applied equally.

TABLE 6

| i | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| antenna port #1 | $e^{j\pi/4}$ | $e^{j\pi/4}$ | $e^{j\pi/4}$ | $e^{j\pi/4}$ | $e^{j\pi/4}$ | $e^{j\pi/4}$ | $e^{j\pi/4}$ | $e^{j\pi/4}$ | $e^{j\pi/4}$ | $e^{j\pi/4}$ | $e^{j\pi/4}$ | $e^{j\pi/4}$ | $e^{j\pi/4}$ | $e^{j\pi/4}$ | $e^{j\pi/4}$ | $e^{j\pi/4}$ |
| antenna port #2 | $e^{j\pi/4}$ | $e^{j\pi/4}$ | $e^{j\pi/4}$ | $e^{j\pi/4}$ | $e^{j3\pi/4}$ | $e^{j3\pi/4}$ | $e^{j3\pi/4}$ | $e^{j3\pi/4}$ | $e^{j5\pi/4}$ | $e^{j5\pi/4}$ | $e^{j5\pi/4}$ | $e^{j5\pi/4}$ | $e^{j7\pi/4}$ | $e^{j7\pi/4}$ | $e^{j7\pi/4}$ | $e^{j7\pi/4}$ |
| antenna port #3 | $e^{j\pi/4}$ | $e^{j3\pi/4}$ | $e^{j5\pi/4}$ | $e^{j7\pi/4}$ | $e^{j\pi/4}$ | $e^{j3\pi/4}$ | $e^{j5\pi/4}$ | $e^{j7\pi/4}$ | $e^{j\pi/4}$ | $e^{j3\pi/4}$ | $e^{j5\pi/4}$ | $e^{j7\pi/4}$ | $e^{j\pi/4}$ | $e^{j3\pi/4}$ | $e^{j5\pi/4}$ | $e^{j7\pi/4}$ |

Specifically, when transmitting and receiving the signal modulated with the QPSK through the 3-layer, three antenna ports may be used. i represents a time indicator (index) (time slot). The receiving device (e.g., terminal) can receive a total of 16 reference signals for each antenna port. In other words, the transmitting device may transmit the reference signal in 16 time slots (indexes). Since the receiving device may be modulated with the QPSK, it is possible to configure 64 demodulation reference vectors by rotating each reference signal by $e^{j\pi/2}$ and may demodulate the data.

When the above-described method is generalized to transmit and receive the signal modulated with the QPSK through the K-layer, the reference signal as shown in Equation 14 is transmitted and received between the receiving device and the transmitting device, and then the data signal may be demodulated.

$$ref.\text{ signal} = e^{j\left(\frac{\pi}{4}+\frac{\pi}{2}\times floor\left(\frac{i-1}{4^{K-q}}\right)\right)} \quad \text{[Equation 14]}$$

Here, K represents the number of layers, q represents an index of an antenna port, and may correspond to q=1, . . . , K. i represents a time index, and may correspond to i=1, . . . , $4^{K-1}$.

When transmitting and receiving the signal modulated with QPSK through K layers, the receiving device may receive a reference signal through K antenna ports, and may receive a reference signal at $4^{K-1}$ time indexes (slots), that is, $4^{K-1}$ times. At least one of the reference signals received at a specific time index (slot) may have a phase difference from the reference signal received at the previous time index (slot) by $\pi/2$. In addition, the receiving device may generate $4^K$ demodulation reference vectors by rotating the received reference signal as a unit of $\pi/2$. In addition, the receiving device may receive the data signal modulated with the QPSK transmitted through K layers, calculate the LLR value based on the demodulation reference vector, and detect the data signal.

In spite of the non-linear relationship between the transmitted signal and the received signal in the 1-bit quantization system by generating the reference signal and transmitting the data signal based on the above-described embodiments and methods (e.g., Example 1, Example 2, Example 3, etc.), the 1-bit quantized signals may be transmitted and received.

In addition, the reference signals described in the above-described embodiments and methods (e.g., Example 1, Example 2, Example 3, etc.) proposed in the present disclosure are power normalization, that is, it is obvious that the reference signals may be applied equally even if the magnitude value is different.

In addition, it is obvious that in the above-described embodiments and methods (e.g., Example 1, Example 2, Example 3, etc.) proposed in the present disclosure, the transmission order of the reference signal may be changed arbitrarily to transmit the reference signal multiple times. In other words, the transmission order of the reference signal may not affect the detection (demodulation) of the data signal.

In addition, the reference signals described in the above-described embodiments and methods (e.g., Example 1, Example 2, Example 3, etc.) proposed in the present disclosure may be time division multiplexing (TDM), frequency division multiplexing (Frequency Division Multiplexing, FDM) or code division multiplexing (CDM).

By the above-described methods and embodiments, it is possible to implement the multi-layer transmission and reception in the 1-bit ADC system.

FIG. 8 illustrates a signaling procedure between the receiving device (e.g., first device, terminal) and the transmitting device (e.g., second device, base station) for transmitting and receiving a multi-layer based on 1-bit quantization to which the method and embodiment proposed in the present specification may be applied (here, the transmitting device/receiving device is only an example, and may be substituted for various devices as described in FIGS. 10 to 14 to be described later). For example, the receiving device may correspond to the first device, the transmitting device to the second device, and vice versa may be considered in some cases. FIG. 8 is merely for convenience of explanation, and does not limit the scope of the present disclosure. Referring to FIG. 8, it is assumed that the transmitting device and/or the receiving device operate based on Examples 1, 2, 3, and the like described above. In addition, it is assumed that the transmitting device and/or the receiving device support multi-layer transmission/reception.

[The transmitting device may transmit the reference signal to the receiving device (S810). For example, the method of generating a reference signal may be based on Examples 1, 2, and 3 described above. As a specific example, the reference signal may be generated differently according to a method of modulating a data signal. For example, the method of modulating a data signal may correspond to BPSK or QPSK. Also, the reference signal may be generated by further considering the number of layers through which the signal is transmitted. For example, the transmitting device and the receiving device may support multi-layer-based transmission/reception, and the number of antenna ports through which the reference signal is transmitted may be the same as the number of layers of the multi-layer.

For example, the reference signal may be transmitted {(modulation order of the data signal)"(number of layers–

1)} times. In other words, the reference signal may be transmitted in {(modulation order of the data signal)"(number of layers−1)} time slots (indexes). For example, when the signal modulated with the QPSK method is transmitted/received through K layers, the reference signal may be transmitted 4K−1 times. For example, at least one of the reference signals transmitted in a specific time slot may have a phase difference of {2p/modulation order of the data signal} from the reference signal transmitted in the previous time slot. For example, the order in which the reference signals are transmitted may be arbitrarily changed by the transmitting device (e.g., a base station). In other words, the transmission order of the reference signal may not affect the detection (demodulation) of the data signal.

For example, an operation in which the transmitting device (e.g., 100/200 in FIGS. 10 to 14) of the above-described step S810 transmits the reference signal to the receiving device (e.g., 100/200 in FIGS. 10 to 14) may be implemented by the devices of FIGS. 10 to 14 to be described below. For example, referring to FIG. 11, one or more processors 102 may control one or more transceivers 106 and/or one or more memories 104, etc. to transmit the reference signal, and one or more transceivers 106 may transmit the reference signal to the receiving device.

The receiving device may generate the demodulation reference vector based on the received reference signal (S820). For example, the demodulation reference vector may be generated by rotating the received reference signal by a predetermined angular unit in consideration of the signal modulation method. For example, in the case of the signal modulated with the BPSK method, the demodulation reference vector may be generated by rotating the received reference signal as a unit of p. For example, in the case of the signal modulated with the QPSK method, the demodulation reference vector may be generated by rotating the received reference signal as a unit of p/2.

For example, the operation of the receiving device (e.g., 100/200 in FIGS. 10 to 14) of generating the demodulation reference vector based on the reference signal in step S820 described above may be implemented by the device of FIGS. 10 to 14 to be described below. For example, referring to FIG. 11, one or more processors 202 may control one or more transceivers 206 and/or one or more memories 204, etc., to generate the demodulation reference vector, and one or more processors 202 may generate the demodulation reference vector.

The transmitting device may transmit the data signal to the receiving device (S830). For example, the data signal may be transmitted through the multi-layer. In addition, the data signal may be modulated using the BPSK or QPSK method.

For example, the operation in which the transmitting device (e.g., 100/200 in FIGS. 10 to 14) of the above-described step S830 transmits the data signal to the receiving device (e.g., 100/200 in FIGS. 10 to 14) may be implemented by the devices of FIGS. 10 to 14 to be described below. For example, referring to FIG. 11, one or more processors 102 may control one or more transceivers 106 and/or one or more memories 104, etc. to transmit the data signal, and one or more transceivers 106 may transmit the data signal to the receiving device.

The receiving device may perform decoding on the received data signal based on the demodulation reference vector (S840). For example, the receiving device may calculate the LLR based on the demodulation reference vector. For example, the method of calculating the LLR may be based on Examples 1, 2, and 3 described above.

For example, the operation in which the receiving device (e.g., 100/200 in FIGS. 10 to 14) of the above-described step S840 performs decoding on the received data signal based on the demodulation reference vector may be performed by the device illustrated in FIGS. 10 to 14 to be described below. For example, referring to FIG. 11, one or more processors 202 may control one or more transceivers 206 and/or one or more memories 204, etc., to perform the decoding on the received data signal based on the demodulation reference vector, etc., and one or more processors 202 may perform the decoding on the data signal.

FIG. 9 illustrates an example of an operation flowchart of the apparatus for transmitting and receiving the multi-layer based on the 1-bit quantization to which the method and embodiment proposed in the present disclosure may be applied. FIG. 9 is merely for convenience of explanation, and does not limit the scope of the present disclosure. Referring to FIG. 9, it is assumed that the first device and/or the second device operate based on Examples 1, 2, and 3 described above. Also, it is assumed that the first device and/or the second device support the multi-layer transmission/reception. Here, the first device/second device is only an example, and various devices as described in FIGS. 10 to 14 to be described later may be used instead of the first device/second device. In addition, since the first device and the second device are merely exemplary expressions for convenience of description, they should not be construed as being limited to the corresponding expressions.

The first device (e.g., receiving device) may receive a reference signal (RS) from the second device (e.g., transmitting device) (S910). For example, the method of generating a reference signal may be based on Examples 1, 2, and 3 described above. As a specific example, the reference signal may be generated differently according to a method of modulating a data signal. For example, the method of modulating a data signal may correspond to the binary phase shift keying (BPSK) or the quadrature phase shift keying (QPSK). Also, the reference signal may be generated by further considering the number of layers through which the signal is received. For example, the first device (e.g., receiving device) and the second device (e.g., transmitting device) may support the multi-layer-based transmission and reception, and the number of antenna ports through which the reference signal is transmitted may be equal to (corresponding to) the number of layers of the multi-layer. Also, the number of antenna ports through which the reference signal is received may be greater than or equal to the number of layers.

For example, the reference signal may be received {(modulation order of the data signal)"(number of layers−1)} times. In other words, the reference signal may be received in {(modulation order of the data signal)"(number of layers−1)} time slots (indexes). For example, when the signal modulated with the QPSK method is transmitted/received through K layers, the reference signal may be transmitted 4K−1 times. For example, at least one of the reference signals received in a specific time slot may have a phase difference of {2p/modulation order of the data signal} from the reference signal received in the previous time slot. For example, the order in which the reference signals are transmitted may be arbitrarily changed by the transmitting device (e.g., a base station). In other words, the reception order of the reference signal may not affect the detection (demodulation) of the data signal.

For example, the operation in which the first device (e.g., receiving device) (100/200 in FIGS. 10 to 14) in step S910 described above receives the reference signal from the second device (e.g., transmitting device) (100/200 in FIGS. 10 to 14) may be implemented by the apparatus of FIGS. 10 to 14 to be described below. For example, referring to FIG. 11, one or more processors 102 may control one or more transceivers 106 and/or one or more memories 104, etc., to receive the reference signal, and one or more transceivers 106 may receive the reference signal from the second device (e.g., transmitting device).

The first device (e.g., receiving device) may generate the demodulation reference vector based on the received reference signal (S920). For example, the demodulation reference vector may be generated by rotating the received reference signal by a predetermined angular unit in consideration of the method of modulating a data signal. For example, in the case of the signal modulated with the BPSK scheme, the demodulation reference vector may be generated by rotating the received reference signal as a unit of π. For example, in the case of the signal modulated with the QPSK scheme, the demodulated reference vector may be generated by rotating the received reference signal as a unit of π/2. For example, the first device (e.g., receiving device) may generate (modulation order of the data signal)"(number of layers) demodulation reference vectors.

For example, the operation in which the first device (e.g., receiving device) (100/200 in FIGS. 10 to 14) generates the demodulation reference vector based on the reference signal in step S920 may be implemented by FIGS. 10 to 14 to be described below. For example, referring to FIG. 11, one or more processors 102 may control one or more transceivers 106 and/or one or more memories 104, etc., to generate the demodulation reference vector, and one or more processors 102 may generate the demodulation reference vector.

The first device (e.g., receiving device) may receive the data signal from the second device (e.g., transmitting device) (S930). For example, the data signal may be received through the multi-layer. In addition, the data signal may be modulated with the BPSK or QPSK scheme. Also, the first device (e.g., receiving device) may include a plurality of receiving paths and may receive a data signal through the plurality of receiving paths. For example, each receive path of the plurality of receive paths may include a 1-bit analog to digital converter (ADC). The reference signal and the data signal may be quantized through a 1-bit ADC. For example, the types of signals transmitted to the baseband through the 1-bit ADC may be limited to four types per reception path. That is, one signal among (1+j), (1−j), (−1+j), and (−1−j) may be received for each reception path. Also, the first device (e.g., receiving device) (the device of FIGS. 10 to 14) may perform the decoding on the received data signal based on the demodulation reference vector. The first device (e.g., receiving device) may calculate the LLR of the received data signal based on the demodulation reference vector.

For example, the operation in which the first device (e.g., receiving device) (100/200 in FIGS. 10 to 14) in step S930 described above receives the data signal from the second device (e.g., transmitting device) (100/200 in FIGS. 10 to 14) may be implemented by the apparatus of FIGS. 10 to 14 to be described below. For example, referring to FIG. 11, one or more processors 102 may control one or more transceivers 106 and/or one or more memories 104, etc., to receive the data signal, and one or more transceivers 106 may receive the data signal from the second device (e.g., transmitting device).

For example, the above-described first device (e.g., receiving device)/second device (e.g., transmitting device) signaling and operation (example: Example 1/Example 2/Example 3/FIG. 8/FIG. 9, etc.) may be implemented by a device (e.g., FIGS. 10 to 14) to be described below. For example, the first device (e.g., receiving device) may correspond to a first wireless device, a second device (e.g., transmitting device) may correspond to a second wireless device, and vice versa in some cases.

For example, the above-described signaling and operation (Example: Example 1/Example 2/Example 3/FIG. 8/FIG. 9, etc.) of the first device (e.g., receiving device)/second device (e.g., transmitting device) may be processed by one or more processors (e.g., 102, 202) of FIGS. 10 to 14, and the above-described signaling and operation (Example: Example 1/Example 2/Example 3/FIG. 8/FIG. 9, etc.) of the first device (e.g., receiving device)/second device (e.g., transmitting device) may be stored in a memory (e.g., one or more memories 104, 204 of FIG. 11) in the form of instructions/programs (e.g. instruction, executable code) for driving at least one processor (e.g., 102 and 202) of FIGS. 10 to 14.

Example of Communication System to which Present Disclosure is Applied

Although not limited thereto, but various descriptions, functions, procedures, proposals, methods, and/or operation flowcharts of the present disclosure, which are disclosed in this document may be applied to various fields requiring wireless communications/connections (e.g., 5G) between devices.

Hereinafter, the communication system will be described in more detail with reference to drawings. In the following drawings/descriptions, the same reference numerals will refer to the same or corresponding hardware blocks, software blocks, or functional blocks if not differently described.

FIG. 10 illustrates a communication system applied to the present disclosure.

Referring to FIG. 10, a communication system 1 applied to the present disclosure includes a wireless device, a BS, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 100*a*. vehicles 100*b*-1 and 100*b*-2, an extended Reality (XR) device 100*c*, a hand-held device 100*d*, a home appliance 100*e*, an Internet of Thing (IoT) device 100*f*, and an AI device/server 400. For example, the vehicle may include a vehicle with a wireless communication function, an autonomous driving vehicle, a vehicle capable of performing inter-vehicle communication, and the like. Here, the vehicle may include an Unmanned Aerial Vehicle (UAV) (e.g., drone). The XR device may include an Augmented Reality (AR)/Virtual Reality (VR)/Mixed Reality (MR) device and may be implemented as a form such as a head-mounted device (HMD), a head-up display (HUD) provided in the vehicle, a television, a smart phone, a computer, a wearable device, a home appliance device, digital signage, a vehicle, a robot, etc. The hand-held device may include the smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the BS and the network may be implemented even the wireless device and a specific wireless device 200*a* may operate an eNB/network node for another wireless device.

The wireless devices 100*a* to 100*f* may be connected to a network 300 through a BS 200. An artificial intelligence (AI) technology may be applied to the wireless devices 100*a* to 100*f* and the wireless devices 100*a* to 100*f* may be connected to an AI server 400 through the network 300. The network 300 may be configured by using a 3G network, a 4G (e.g., LTE) network, or a 5G (e.g., NR) network. The wireless devices 100*a* to 100*f* may communicate with each other through the BS 200/network 300, but may directly communicate with each other without going through the BS/network (sidelink communication). For example, the vehicles 100*b*-1 and 100*b*-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 100*a* to 100*f*.

Wireless communications/connections 150*a*, 150*b*, and 150*c* may be made between the wireless devices 100*a* to 100*f* and the BS 200 and between the BS 200 and the BS 200. Here, the wireless communication/connection may be made through various wireless access technologies (e.g., 5G NR) such as uplink/downlink communication 150*a*, sidelink communication 150*b* (or 020 communication), and inter-BS communication 150*c* (e.g., relay, Integrated Access Backhaul (IAB). The wireless device and the BS/the wireless device and the BS and the BS may transmit/receive radio signals to/from each other through wireless communications/connections 150*a*, 150*b*, and 150*c*. For example, the wireless communications/connections 150*a*, 150*b*, and 150*c* may transmit/receive signals through various physical channels. To this end, based on various proposals of the present disclosure, at least some of various configuration information setting processes, various signal processing processes (e.g., channel encoding/decoding, modulation/demodulation, resource mapping/demapping, etc.), a resource allocation process, and the like for transmission/reception of the radio signal may be performed.

Example of Wireless Device to which Present Disclosure is Applied

FIG. 11 illustrates a wireless device which may be applied to the present disclosure.

Referring to FIG. 11, a first wireless device 100 and a second wireless device 200 may transmit/receive radio signals through various wireless access technologies (e.g., LTE and NR). Here, the first wireless device 100 and the second wireless device 200 may correspond to a wireless device 100*x* and a BS 200 and/or a wireless device 100*x* and a wireless device 100*x* of FIG. 10.

The first wireless device 100 may include one or more processors 102 and one or more memories 104 and additionally further include one or more transceivers 106 and/or one or more antennas 108. The processor 102 may control the memory 104 and/or the transceiver 106 and may be configured to implement descriptions, functions, procedures, proposals, methods, and/or operation flows disclosed in the present disclosure. For example, the processor 102 may process information in the memory 104 and generate a first information/signal and then transmit a radio signal including the first information/signal through the transceiver 106. Further, the processor 102 may receive a radio signal including a second information/signal through the transceiver 106 and then store in the memory 104 information obtained from signal processing of the second information/signal. The memory 104 may connected to the processor 102 and store various information related to an operation of the processor 102. For example, the memory 104 may store a software code including instructions for performing some or all of processes controlled by the processor 102 or performing the descriptions, functions, procedures, proposals, methods, and/or operation flowcharts disclosed in the present disclosure. Here, the processor 102 and the memory 104 may be a part of a communication modem/circuit/chip designated to implement the wireless communication technology (e.g., LTE and NR). The transceiver 106 may be connected to the processor 102 and may transmit and/or receive the radio signals through one or more antennas 108. The transceiver 106 may include a transmitter and/or a receiver. The transceiver 106 may be used mixedly with a radio frequency (RF) unit. In the present disclosure, the wireless device may mean the communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement descriptions, functions, procedures, proposals, methods, and/or operation flows disclosed in the present disclosure. For example, the processor 202 may process information in the memory 204 and generate a third information/signal and then transmit a radio signal including the third information/signal through the transceiver 206. Further, the processor 202 may receive a radio signal including a fourth information/signal through the transceiver 206 and then store in the memory 204 information obtained from signal processing of the fourth information/signal. The memory 204 may connected to the processor 202 and store various information related to an operation of the processor 202. For example, the memory 204 may store a software code including instructions for performing some or all of processes controlled by the processor 202 or performing the descriptions, functions, procedures, proposals, methods, and/or operation flowcharts disclosed in the present disclosure. Here, the processor 202 and the memory 204 may be a part of a communication modem/circuit/chip designated to implement the wireless communication technology (e.g., LTE and NR). The transceiver 206 may be connected to the processor 202 and may transmit and/or receive the radio signals through one or more antennas 208. The transceiver 206 may include a transmitter and/or a receiver and the transceiver 206 may be mixed with the RF unit. In the present disclosure, the wireless device may mean the communication modem/circuit/chip.

Hereinafter, hardware elements of the wireless devices 100 and 200 will be described in more detail. Although not limited thereto, one or more protocol layers may be implemented by one or more processors 102 and 202. For example, one or more processors 102 and 202 may implement one or more layers (e.g., functional layers such as PHY, MAC, RLC, PDCP, RRC, and SDAP). One or more processors 102 and 202 may generate one or more protocol data units (PDUs) and/or one or more service data units (SDUs) according to the descriptions, functions, procedures, proposals, methods, and/or operation flowcharts disclosed in the present disclosure. One or more processors 102 and 202 may generate a message, control information, data, or information according to the descriptions, functions, procedures, proposals, methods, and/or operation flowcharts disclosed in the present disclosure. One or more processors 102 and 202 may generate a signal (e.g., a baseband signal) including the PDU, the SDU, the message, the control information, the data, or the information according to the function, the procedure, the proposal, and/or the method disclosed in the present disclosure and provide the generated signal to one or more transceivers 106 and 206. One or more processors 102 and 202 may receive the signal (e.g., baseband signal) from one or more transceivers 106 and 206 and acquire the PDU, the SDU, the message, the control information, the data, or the information according to the descriptions, functions, procedures, proposals, methods, and/or operation flowcharts disclosed in the present disclosure.

One or more processors 102 and 202 may be referred to as a controller, a microcontroller, a microprocessor, or a microcomputer. One or more processors 102 and 202 may be implemented by hardware, firmware, software, or a combination thereof. As one example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 102 and 202. The descriptions, functions, procedures, proposals, and/or operation flowcharts disclosed in the present disclosure may be implemented by using firmware or software and the firmware or software may be implemented to include modules, procedures, functions, and the like. Firmware or software configured to perform the descriptions, functions, procedures, proposals, and/or operation flowcharts disclosed in the present disclosure may be included in one or more processors 102 and 202 or stored in one or more memories 104 and 204 and driven by one or more processors 102 and 202. The descriptions, functions, procedures, proposals, and/or operation flowcharts disclosed in the present disclosure may be implemented by using firmware or software in the form of a code, the instruction and/or a set form of the instruction.

One or more memories 104 and 204 may be connected to one or more processors 102 and 202 and may store various types of data, signals, messages, information, programs, codes, instructions, and/or commands. One or more memories 104 and 204 may be configured by a ROM, a RAM, an EPROM, a flash memory, a hard drive, a register, a cache memory, a computer reading storage medium, and/or a combination thereof. One or more memories 104 and 204 may be positioned inside and/or outside one or more processors 102 and 202. Further, one or more memories 104 and 204 may be connected to one or more processors 102 and 202 through various technologies such as wired or wireless connection.

One or more transceivers 106 and 206 may transmit to one or more other devices user data, control information, a wireless signal/channel, etc., mentioned in the methods and/or operation flowcharts of the present disclosure. One or more transceivers 106 and 206 may receive from one or more other devices user data, control information, a wireless signal/channel, etc., mentioned in the descriptions, functions, procedures, proposals, methods, and/or operation flowcharts disclosed in the present disclosure. For example, one or more transceivers 106 and 206 may be connected to one or more processors 102 and 202 and transmit and receive the radio signals. For example, one or more processors 102 and 202 may control one or more transceivers 106 and 206 to transmit the user data, the control information, or the radio signal to one or more other devices. Further, one or more processors 102 and 202 may control one or more transceivers 106 and 206 to receive the user data, the control information, or the radio signal from one or more other devices. Further, one or more transceivers 106 and 206 may be connected to one or more antennas 108 and 208 and one or more transceivers 106 and 206 may be configured to transmit and receive the user data, control information, wireless signal/channel, etc., mentioned in the descriptions, functions, procedures, proposals, methods, and/or operation flowcharts disclosed in the present disclosure through one or more antennas 108 and 208. In the present disclosure one or more antennas may be a plurality of physical antennas or a plurality of logical antennas (e.g., antenna ports). One or more transceivers 106 and 206 may convert the received radio signal/channel from an RF band signal to a baseband signal in order to process the received user data, control information, radio signal/channel, etc., by using one or more processors 102 and 202. One or more transceivers 106 and 206 may convert the user data, control information, radio signal/channel, etc., processed by using one or more processors 102 and 202, from the baseband signal into the RF band signal. To this end, one or more transceivers 106 and 206 may include an (analog) oscillator and/or filter.

Example of Signal Processing Circuit to which Present Disclosure is Applied

FIG. 12 illustrates a signal processing circuit for a transmit signal.

Referring to FIG. 12 a signal processing circuit 1000 may include a scrambler 1010, a modulator 1020, a layer mapper 1030, a precoder 1040, a resource mapper 1050, and a signal generator 1060. Although not limited thereto, an operation/function of FIG. 12 may be performed by the processors 102 and 202 and/or the transceivers 106 and 206 of FIG. 11. Hardware elements of FIG. 12 may be implemented in the processors 102 and 202 and/or the transceivers 106 and 206 of FIG. 11. For example, blocks 1010 to 1060 may be implemented in the processors 102 and 202 of FIG. 11. Further, blocks 1010 to 1050 may be implemented in the processors 102 and 202 of FIG. 11 and the block 1060 may be implemented in the transceivers 106 and 206 of FIG. 11.

A codeword may be transformed into a radio signal via the signal processing circuit 1000 of FIG. 12. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-Binary Phase Shift Keying (pi/2-BPSK), m-Phase Shift Keying (m-PSK), m-Quadrature Amplitude Modulation (m-QAM), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols.

Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) insertor, a Digital-to-Analog Converter (DAC), a frequency uplink converter, and the like.

A signal processing process for a receive signal in the wireless device may be configured in the reverse of the signal processing process (1010 to 1060) of FIG. 12. For example, the wireless device (e.g., 100 or 200 of FIG. 11) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Utilization Example of Wireless Device to which Present Disclosure is Applied FIG. 13 illustrates another example of a wireless device applied to the present disclosure. The wireless device may be implemented as various types according to a use example/service (see FIG. 10).

Referring to FIG. 13, wireless devices 100 and 200 may correspond to the wireless devices 100 and 200 of FIG. 11 and may be constituted by various elements, components, units, and/or modules. For example, the wireless devices 100 and 200 may include a communication unit 110, a control unit 120, and a memory unit 130, and an additional element 140. The communication unit may include a communication circuit 112 and a transceiver(s) 114. For example, the communication circuit 112 may include one or more processors 102 and 202 and/or one or more memories 104 and 204 of FIG. 11. For example, the transceiver(s) 114 may include one or more transceivers 106 and 206 and/or one or more antennas 108 and 208 of FIG. 11. The control unit 120 is electrically connected to the communication unit 110, the memory unit 130, and the additional element 140 and controls an overall operation of the wireless device. For example, the control unit 120 may an electrical/mechanical operation of the wireless device based on a program/code/instruction/information stored in the memory unit 130. Further, the control unit 120 may transmit the information stored in the memory unit 130 to the outside (e.g., other communication devices) through the communication unit 110 via a wireless/wired interface or store information received from the outside (e.g., other communication devices) through the wireless/wired interface through the communication unit 110.

The additional element 140 may be variously configured according to the type of wireless device. For example, the additional element 140 may include at least one of a power unit/battery, an input/output (I/O) unit, a driving unit, and a computing unit. Although not limited thereto, the wireless device may be implemented as a form such as the robot 100*a* of FIG. W1, the vehicles 100*b*-1 and 100*b*-2 of FIG. W1, the XR device 100*c* of FIG. W1, the portable device 100*d* of FIG. W1, the home appliance 100*e* of FIG. W1, the IoT device 100*f* of FIG. W1, a digital broadcasting terminal, a hologram device, a public safety device, an MTC device, a medical device, a fintech device (or financial device), a security device, a climate/environment device, an AI server/device 400 of FIG. W1, the BS 200 of FIG. W1, a network node, etc. The wireless device may be movable or may be used at a fixed place according to a use example/service.

In FIG. 13, all of various elements, components, units, and/or modules in the wireless devices 100 and 200 may be interconnected through the wired interface or at least may be wirelessly connected through the communication unit 110. For example, the control unit 120 and the communication 110 in the wireless devices 100 and 200 may be wiredly connected and the control unit 120 and the first unit (e.g., 130 or 140) may be wirelessly connected through the communication unit 110. Further, each element, component, unit, and/or module in the wireless devices 100 and 200 may further include one or more elements. For example, the control unit 120 may be constituted by one or more processor sets. For example, the control unit 120 may be configured a set of a communication control processor, an application processor, an electronic control unit (ECU), a graphic processing processor, a memory control processor, etc. As another example, the memory 130 may be configured as a random access memory (RAM), a dynamic RAM (DRAM), a read only memory (ROM), a flash memory, a volatile memory, a non-volatile memory, and/or combinations thereof.

Example of Hand-Held Device to which Present Disclosure is Applied

FIG. 14 illustrates a hand-held device applied to the present disclosure. The hand-held device may include a smart phone, a smart pad, a wearable device (e.g., a smart watch, a smart glass), and a hand-held computer (e.g., a notebook, etc.). The hand-held device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 14, a hand-held device 100 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. The blocks 110 to 130/140*a* to 140*c* correspond to the blocks 110 to 130/140 of FIG. 13, respectively.

The communication unit 110 may transmit/receive a signal (e.g., data, a control signal, etc.) to/from another wireless device and BSs. The control unit 120 may perform various operations by controlling components of the hand-held device 100. The control unit 120 may include an Application Processor (AP). The memory unit 130 may store data/ parameters/programs/codes/instructions required for driving the handheld device 100. Further, the memory unit 130 may store input/output data/information, etc. The power supply unit 140*a* may supply power to the hand-held device 100 and include a wired/wireless charging circuit, a battery, and the like. The interface unit 140*b* may support a connection between the hand-held device 100 and another external device. The interface unit 140*b* may include various ports (e.g., an audio input/output port, a video input/output port) for the connection with the external device. The input/output unit 140*c* may receive or output a video information/signal, an audio information/signal, data, and/or information input from a user. The input/output unit 140*c* may include a camera, a microphone, a user input unit, a display unit 140*d*, a speaker, and/or a haptic module.

As one example, in the case of data communication, the input/output unit 140*c* may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140*c*.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although the method of transmitting and receiving a signal in the wireless communication system of the present disclosure has been mainly described with examples applied to the 3GPP LTE/LTE-A system and the 5G system (New RAT system), it is possible to apply the method to various wireless communication systems.

The invention claimed is:

1. A method comprising:

receiving, by a first device from a second device, configuration information related to a reference signal (RS);

receiving, by the first device from the second device, the RS based on the configuration information;

generating, by the first device, a demodulation reference vector based on the reference signal;

receiving, by the first device from the second device, a data signal based on the demodulation reference vector; and decoding, by the first device, the data signal, wherein the reference signal is generated differently based on a modulation scheme of the data signal, and wherein the reference signal is received in time slots which is based on modulation order and a number of layers of the data signal.

2. The method of claim 1, wherein the time slots is determined by {(the modulation order of the data signal)^(the number of layers−1)}.

3. The method of claim 2, wherein at least one of reference signals received in a specific time slot has a phase difference of {2pi(π)/modulation order of the data signal} with a reference signal received in a previous time slot.

4. The method of claim 1, wherein the modulation scheme of the data signal is BPSK (Binary Phase Shift Keying) or QPSK (Quadrature Phase Shift Keying).

5. The method of claim 4, wherein based on the modulation scheme of the data signal being the BPSK, the demodulation reference vector is generated by rotating the reference signal in pi (π) unit.

6. The method of claim 4, wherein based on the modulation scheme of the data signal being the QPSK, the demodulation reference vector is generated by rotating the reference signal in pi (π)/2 unit.

7. The method of claim 1, wherein receiving the data signal comprises: calculating a log likelihood ratio (LLR) of the data signal based on the demodulation reference vector.

8. The method of claim 1, wherein each receive path of the first device includes a 1-bit analog to digital converter (ADC), and wherein the reference signal and the data signal are quantized through the 1-bit ADC.

9. A method comprising:

transmitting, by a second device to a first device, configuration information related to a reference signal (RS);

transmitting, by the second device to the first device, the RS based on the configuration information;

transmitting, by the second device to the first device, a data signal, wherein the reference signal is generated differently based on a modulation scheme of the data signal, and wherein the reference signal is transmitted in time slots which is based on modulation order and a number of layers of the data signal.

10. The method of claim 9, wherein the time slots is determined by {(the modulation order of the data signal)^(the number of layers−1)}.

11. The method of claim 10, wherein at least one of reference signals received in a specific time slot has a phase difference of {2pi(π)/modulation order of the data signal} with a reference signal received in a previous time slot.

12. The method of claim 10, wherein a transmission order of the reference signal is independent of a demodulation of the data signal.

13. The method of claim 9, wherein the modulation scheme of the data signal is BPSK (Binary Phase Shift Keying) or QPSK (Quadrature Phase Shift Keying).

14. The method of claim 13, wherein based on the modulation scheme of the data signal being the BPSK, the demodulation reference vector is based on a rotation of the reference signal in pi (π) unit.

15. The method of claim 13, wherein based on the modulation scheme of the data signal being the QPSK, the demodulation reference vector is based on a rotation of the reference signal in pi (π)/2 unit.

16. A first device comprising:

transmission and reception unit for transmitting and receiving a radio signal; and a processor functionally connected to the transmission and reception unit, wherein the processor is configured to:

receiving, by the first device from a second device, configuration information related to a reference signal (RS);

receiving, by the first device from the second device, the RS based on the configuration information;

generating, by the first device, a demodulation reference vector based on the reference signal;

receiving, by the first device from the second device, a data signal based on the demodulation reference vector; and decoding, by the first device, the data signal, wherein the reference signal is generated differently based on a modulation scheme of the data signal, and wherein the reference signal is received in time slots which is based on modulation order and a number of layers of the data signal.

17. The first device of claim 16, wherein the time slots is determined by {(the modulation order of the data signal)^(the number of layers−1)}.

18. The first device of claim 17, wherein at least one of reference signals received in a specific time slot has a phase difference of {2pi(π)/modulation order of the data signal} with a reference signal received in a previous time slot.

19. The first device of claim 16, wherein the modulation scheme of the data signal is BPSK (Binary Phase Shift Keying) or QPSK (Quadrature Phase Shift Keying).

20. The first device of claim 19, wherein based on the modulation scheme of the data signal being the BPSK, the demodulation reference vector is generated by rotating the reference signal in pi (π) unit.

* * * * *